INVENTOR.
George D. Shaeffer.
BY
Harness, Dickey & Pierce.
ATTORNEYS.

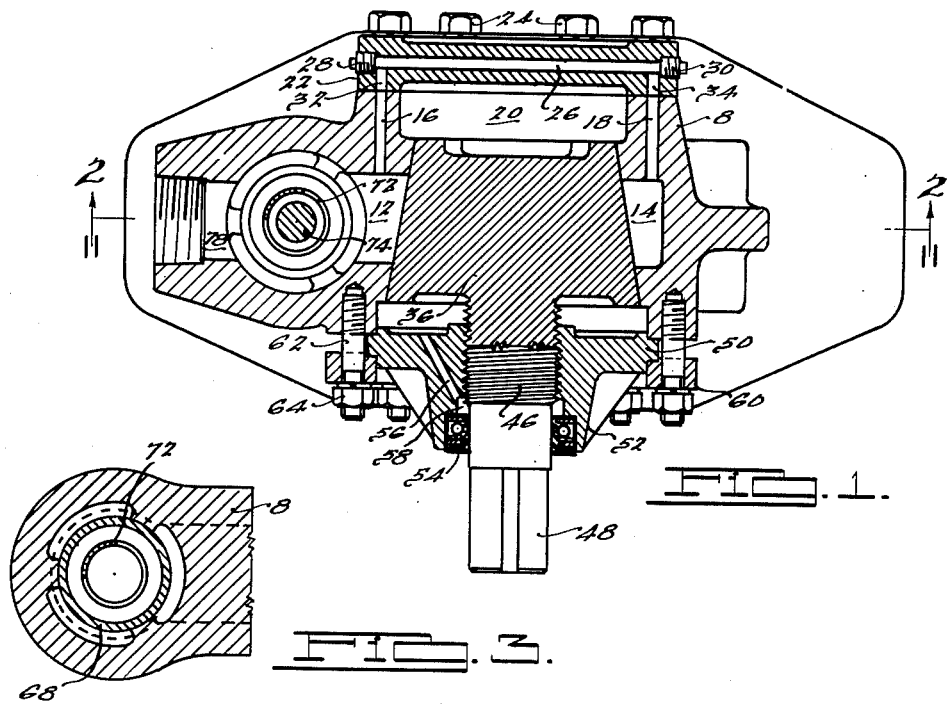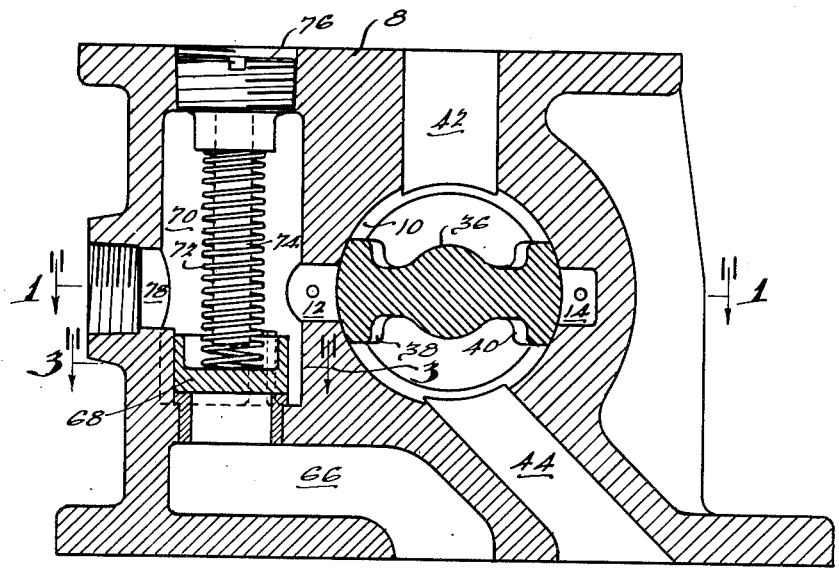

Patented Dec. 2, 1952

2,620,155

UNITED STATES PATENT OFFICE 2,620,155

AXIALLY MOVABLE ROTARY VALVE

George D. Shaeffer, Detroit, Mich., assignor to Gar Wood Industries, Inc., Detroit, Mich., a corporation of Michigan Application January 26, 1946, Serial No. 643,621

6 Claims. (Cl. 251—97)

This invention relates to the valves for controlling fluid under pressure.

The main objects of this invention are to provide a valve which can be tightly seated in metal to metal contact to hold fluid under high pressure but which can be readily unseated with a minimum of operating force; to provide a valve having a tapered plug which moves axially during the opening and closing movements so that in the closed position it is in tight metal to metal contact with its seat and when in open position there is a clearance between the plug and its seat; to provide a valve of the foregoing character which may be readily adjusted to compensate for wear; and to provide an improved means for adjusting the wear of the valve plug and seat without changing the relative angular positions of the valve plug in the casing.

Figure 4:
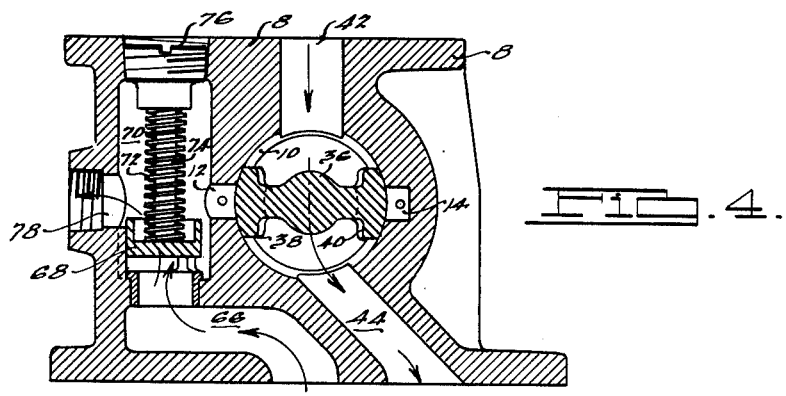
Figure 5:
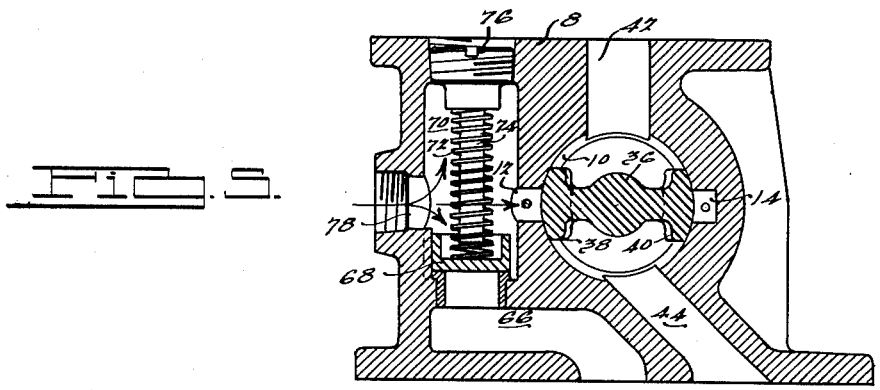
Figure 6:
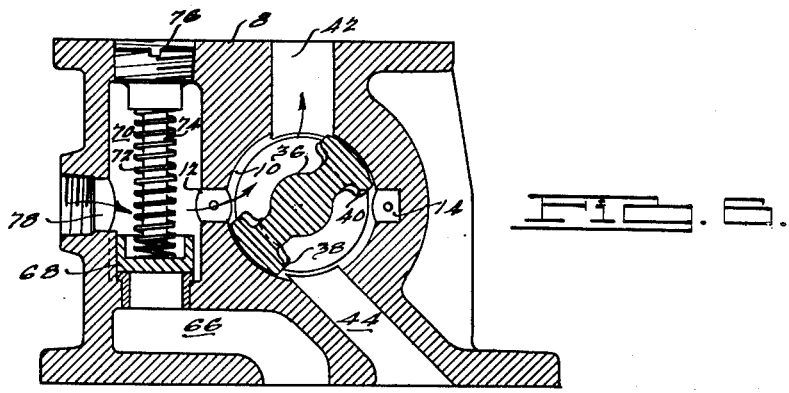

An illustrative embodiment of this invention is shown in the accompanying drawings, in which, Fig. 1 is a sectional view of the improved valve taken along the line 1—1 of Fig. 2, looking in the direction indicated by the arrows and showing the plug in closed position, Fig. 2 is a sectional view taken on the line 2—2 of Fig. 1, looking in the direction indicated by the arrows, Fig. 3 is a fragmentary sectional view taken on the line 3—3 of Fig. 2 looking in the direction indicated by the arrows, Fig. 4 is a view similar to Fig. 2 but showing the associated check valve in open position and with arrows indicating the flow of fluid through the valve with the plug in closed position, Fig. 5 is another view of the same but with the check valve closed, Fig. 6 is another view of the same but with the plug valve rotated to open position.

In the construction shown in the drawings, the improved valve comprises a body 8 having an opening therethrough, a portion of which is tapered to form a valve seat 10. The tapered seat 10 is provided with ports 12 and 14 positioned at diametrically opposed locations which communicate with axially extending communicating passageways 16 and 18, respectively. The passageways 16 and 18 lead to a faced-off portion of the body 8 which surrounds the smaller end of the valve opening therethrough.

The body 8 is recessed to provide a chamber 20 at the smaller end of the tapered valve seat opening and a disc-like closure plate 22 is secured thereover by a series of cap screws 24 for sealing that end of the valve body. The closure plate 22 is provided with a diametrically extending passageway 26, closed at its ends by threaded plugs 28 and 30 and axially extending passageways 32 and 34. The passageways 32 and 34 register with the passageways 16 and 18, respectively, when the closure plate 22 is secured in place. The passageways 32 and 34 also communicate with the passageway 26 and thus provide means for equalizing the pressure in the ports 12 and 14 at all times.

A tapered plug 36 is provided for co-operating with tapered valve seat 10 and is formed with diametrically extending segmental portions 38 and 40 of greater circumferential extent than the ports 12 and 14, so as to overlap and tightly close said ports with a metal to metal fit when in the angular position shown in Figs. 1, 2, 4 and 5 and properly adjusted axially, as will be hereinafter more fully explained.

The smaller end of the plug 36 terminates adjacent the juncture of the tapered valve seat 10 and the chamber 20 so as to leave an unobstructed passageway through the chamber 20 from a fluid inlet passageway 42 to an outlet passageway 44, both of which communicate with the valve seat opening through the body at diametrically opposed points located substantially at right angles to the ports 12 and 14.

The larger end of the plug 36 is provided with an axially extending, integrally formed, threaded shank 46 which terminates in a squared portion 48 for receiving an operating handle whereby the plug may be rotated.

The larger end of the valve seat opening through the body 8 is provided with a circular cover 50 having an axially extending threaded opening therethrough for receiving the threaded shank 46 of the plug valve 36. The cover plate 50 is provided with an axially extending integrally formed collar 52 which surrounds the valve stem and the outer end of which is interiorly recessed to receive an oil seal 54. A drain passageway 56 is formed in the cover plate which provides communication between an annular space 58 under the oil seal 54 and the plug opening within the valve body.

Means are provided for securing the cover plate 50 to the body 8 and comprise an annular clamping ring 60 which overlaps the marginal edge of the plate 50 and a series of studs 62 extending through the openings formed in the clamping ring. Each of the studs 62 has one end threaded into the body 8 and a nut 64 on its other end which bears against the clamping ring 60.

The end of the body 8 which receives the cover plate 50 is formed so that the plate 50 may be secured thereto at any selected angular position.

The body 8 is also provided with a passageway 66 which communicates through a spring pressed check valve 68 with a chamber 70, which houses a spring 72 and a guide stem 74 mounted axially in a threaded closure plug 76.

The chamber 70 is in communication with the port 12 and with a passageway 78 which is threaded to receive a conduit leading to the unit or device to be operated or controlled by the valve assembly.

In the operation of this control valve, the cover plate 50 is rotated relative to the valve stem 46 so that the valve 36 is tightly seated in metal to metal contact in the position shown in Figs. 1 and 2 of the drawings with the cover tightly clamped in position by the nuts 64.

When in this adjusted position, the valve is opened by lefthand rotation with a control handle attached to the squared end 48 of the valve stem and such lefthand rotation causes the valve 46 to move axially away from its valve seat at the same time that the segmental portions 38 and 40 are rotated so as to uncover the ports 12 and 14, respectively.

When it is desired to close the valve it is rotated in a righthand direction and as the segmental portions 38 and 40 rotate into position to close the ports 12 and 14, respectively, the valve plug as a whole moves axially inward against its tapered seat so as to form a tight metal to metal contact therewith and thus effect a closure for a high pressure line.

Due to the communicating passageways 16, 32, 26, 34 and 18, the pressures in the ports 12 and 14 are substantially equal at all times, thereby relieving the plug 36 from radial pressure in one direction only and which would tend to bind the valve in its tapered valve seat.

The oil seal 54 around the valve plug stem is vented through the passageway 56 to the low pressure side of the system at all times so that the seal is not subjected to destructive pressures.

It will be obvious that as the contacting faces of the segmental portions 38 and 40 wear away during use and the valve seat also wears away during use, the plug 36, when rotated to closed position, would no longer be centered as shown in Fig. 2 of the drawings. Such wear may be compensated for by loosening the nuts 64 and rotating the closure plate 50 in a lefthand direction so as to move the valve an amount equal to the amount of wear between the valve and its seat and then reclamping it in the newly adjusted position. In this manner, the plug may be maintained in its original angular position when closed regardless of the amount of wear of the plug and its seat.

What is claimed is:

1. A valve comprising a body having a tapered valve seat therein and ports at diametrically opposite locations in said seat, a tapered plug for said seat adapted to close said ports when in one angular position and to uncover said ports when turned to another angular position, a member fixed to said body and threadedly engaging said plug whereby relative angular movement between said plug and member causes relative axial movement therebetween, means for securing said member to said body in any angular position relative to said plug, and a manipulating portion fast with respect to said plug and accessible from outside the body.

2. A valve comprising a body having an opening therein providing a tapered valve seat, a tapered plug for said valve seat, a threaded stem fast with respect to said plug, a cover plate for said body opening having a threaded opening therethrough for threadably receiving said stem, and means for securing said cover plate on said body in any selected angular position relative to said valve plug stem.

3. A valve comprising a body having an opening therein providing a tapered valve seat, said body having a port opening in said valve seat surface, a tapered plug for said seat adapted to close said port when in one angular position and to uncover said port when turned to another angular position, a threaded stem fast with respect to said plug, a cover plate for said body opening having a threaded opening therethrough for threadably receiving said stem, whereby relative angular movement between said plug and cover plate causes relative axial movement therebetween, and means for securing said cover plate to said body in any selected angular position relative to said plug valve stem.

4. A valve comprising a hollow body defining a valve chamber having a tapered valve seat therein and ports at diametrically opposite locations in said seat, a tapered plug valve for said seat adapted to close said ports when in one angular position and to uncover said ports when turned to another angular position, a member threadedly engaging said plug whereby relative angular movement between said plug and member causes relative axial movement therebetween and means for securing said member to said body in a selected angular position relative to said plug, said body having passageways therethrough communicating with said valve chamber in angularly spaced relation with respect to said valved ports, said passageways communicating with each other at all positions of said plug valve.

5. A valve comprising a body having an opening therethrough providing a valve chamber and having a tapered valve seat, said body having ports in said valve seat surface at diametrically opposite locations, said body having passageways providing communication between said ports and a closure plate surface at one end thereof, a closure plate adapted to be secured on said surface and having a passageway therethrough providing communication between said port passageways for balancing the pressures in said ports, a tapered plug having diametrically positioned segmental portions adapted to close said ports when in one angular position and to uncover said ports when turned to another angular position, a threaded stem on said plug, a cover plate having a threaded opening therethrough for receiving said threaded stem, and means for securing said cover plate to said body in a selected angular position whereby said plug may be positioned axially to make a metal to metal contact with its seat when in port closing angular position and is withdrawn from such contact when rotated to uncover said ports, said body having passageways therethrough communicating with said valve chamber and positioned in angularly spaced relation with respect to said valved ports, said passageways communicating with each other at all times.

6. A valve comprising a hollow body defining a valve chamber having a tapered valve seat therein and ports at diametrically opposite locations in said seat, a tapered plug valve for said seat adapted to close said ports in one angular position and to open said ports when turned to another angular position, said body having passageways therethrough communicating with said valve chamber in angularly spaced relation with respect to said valved ports, said passageways communicating with each other at all positions of said plug valve.

GEORGE D. SHAEFFER.

REFERENCES CITED

The following references are of record in the file of this patent:

UNITED STATES PATENTS

| Number | Name | Date |
|---|---|---|
| 13,075 | Allen | June 19, 1855 |
| 611,899 | Freeman | Oct. 4, 1898 |
| 1,473,210 | Costello | Nov. 6, 1923 |
| 1,548,526 | Hartzell | Aug. 4, 1925 |
| 1,694,403 | Stevens | Dec. 11, 1928 |
| 1,916,632 | Mueller | July 4, 1933 |

FOREIGN PATENTS

| Number | Country | Date |
|---|---|---|
| 609,128 | Germany | of 1935 |